United States Patent [19]

Nickel

[11] Patent Number: 4,565,356
[45] Date of Patent: Jan. 21, 1986

[54] BUSHING CONSTRUCTION FOR A FIBER REINFORCED PLASTIC LEAF SPRING

[75] Inventor: Herbert W. Nickel, Germantown, Wis.

[73] Assignee: A. O. Smith Corporation, Milwaukee, Wis.

[21] Appl. No.: 541,443

[22] Filed: Oct. 13, 1983

[51] Int. Cl.$^4$ ............................................. F16F 1/18
[52] U.S. Cl. .................................. 267/54 R; 264/137; 264/257; 264/274; 267/148; 384/441
[58] Field of Search ................. 267/47, 54 R, 54 D, 267/148, 149; 16/2; 384/441, 297; 264/136, 137, 257, 274; 428/36

[56] References Cited

U.S. PATENT DOCUMENTS

| 1,634,158 | 6/1927 | Robertson | 267/54 D |
| 3,056,706 | 10/1962 | Knoppel | 154/43 |
| 3,142,598 | 7/1964 | Rosen | 156/162 |
| 3,349,649 | 10/1967 | Mele | 16/2 X |
| 3,376,033 | 4/1968 | Sherwood | 267/47 |
| 3,555,140 | 1/1971 | Argereu | 264/274 X |
| 3,968,958 | 7/1976 | Huchette et al. | 267/47 |
| 4,112,159 | 9/1978 | Pall | 428/36 |
| 4,114,962 | 9/1978 | Konig et al. | 308/238 |
| 4,414,049 | 11/1983 | Jones | 156/166 |
| 4,475,723 | 10/1984 | Meyer | 267/54 R X |

FOREIGN PATENT DOCUMENTS

| 0118341 | 7/1983 | Japan | 267/148 |
| 0474985 | 11/1937 | United Kingdom | |

Primary Examiner—Bruce H. Stoner, Jr.
Assistant Examiner—Robert J. Oberleitner
Attorney, Agent, or Firm—Andrus, Sceales, Starke & Sawall

[57] ABSTRACT

A fiber reinforced plastic leaf spring including a curved central section and a pair of end sections, each having a bushing to receive a connecting member. The spring is formed from a plurality of longitudinally extending substantially continuous strands of fibrous material impregnated with a cured thermosetting resin which are wound in a loop configuration around the bushings. The windings consist of a pair of generally parallel runs which extend between the bushings and are disposed in contiguous relation and the resin is cured to formed an integral structure. Each bushing includes a tubular section and at least one circumferentially extending rib that extends outwardly from the tubular section and is encapsulated in the fibrous windings. The ribs act to prevent delamination of the two runs along the neutral axis of the spring when the spring is subjected to load in service.

9 Claims, 3 Drawing Figures

U.S. Patent  Jan. 21, 1986  4,565,356
FIG.1
FIG.2
FIG.3
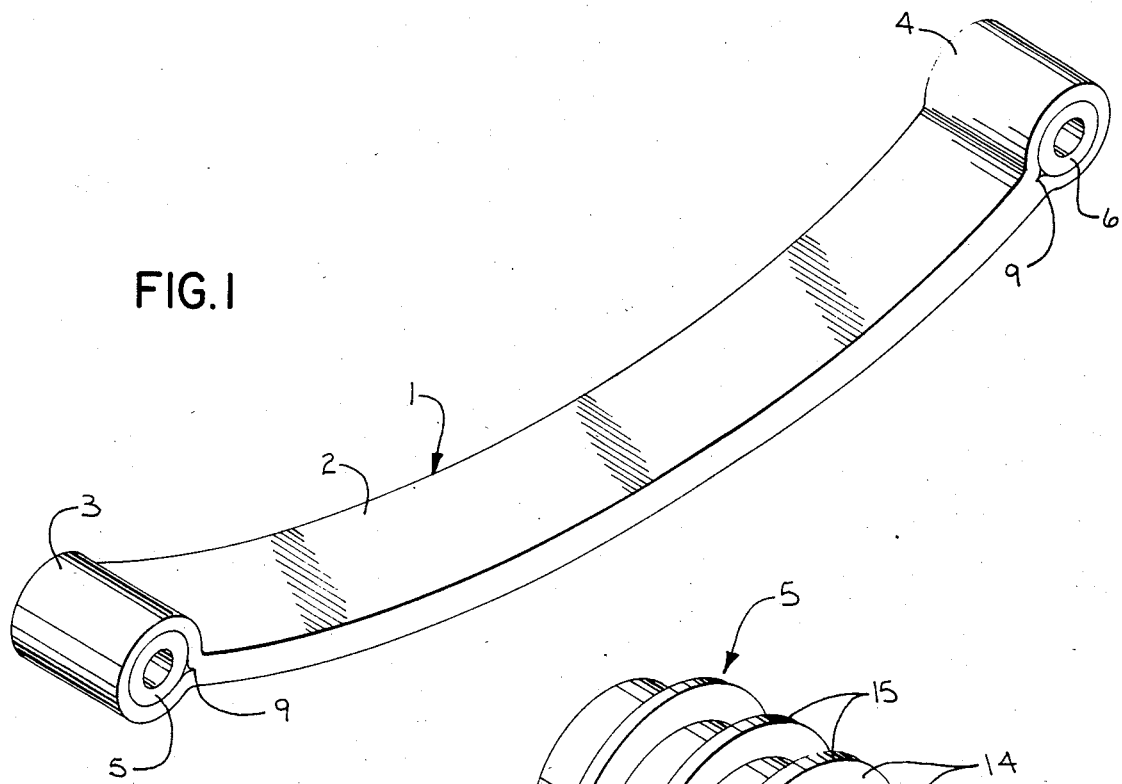
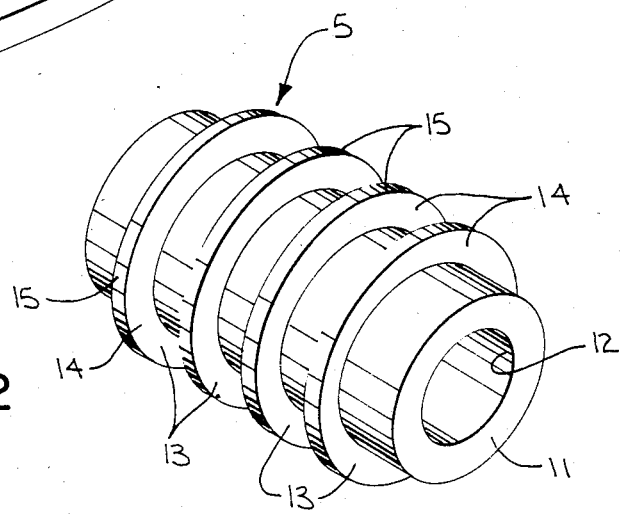
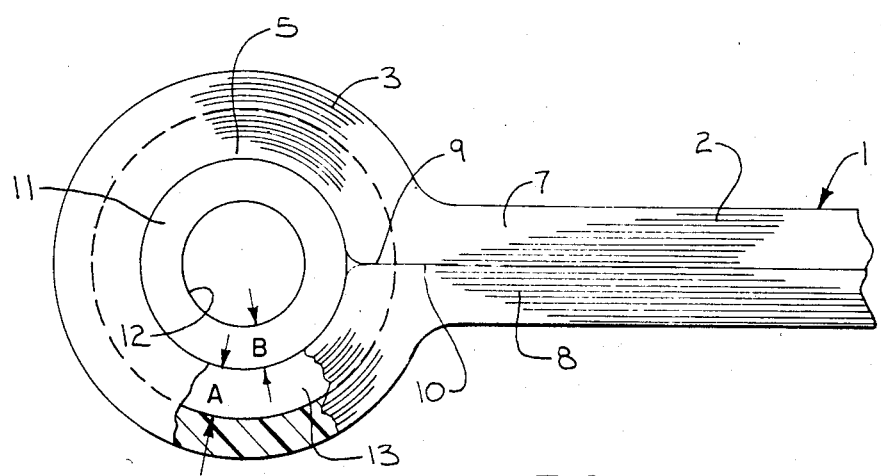

BUSHING CONSTRUCTION FOR A FIBER REINFORCED PLASTIC LEAF SPRING

BACKGROUND OF THE INVENTION

Leaf springs as used in vehicles comprise a generally curved central section and end sections having openings or eyes to receive connectors for attaching the spring to the vehicle. Leaf springs have been constructed of fiber reinforced plastic material in order to reduce the overall weight of the vehicle. In certain leaf springs of this type, the central section is molded from longitudinally extending fibrous material impregnated with a thermosetting resin and separate metal end sections are attached through mechanical connectors to the end of the central section.

In other fiber reinforced plastic leaf springs, continuous strands of fibrous material impregnated with a thermosetting resin are wound around spaced tubular bushings in a loop configurations. The wound structure is then placed in a mold with the parallel runs of the loop configuration being brought together in flatwise contiguous relation. Subsequently, the resin is cured to provide an integral structure. With a spring of this type, the strands extend around the bushings and join the curved central section of the spring at neck areas. In service, when a load is applied to the end portions of the spring, the strands have a tendency to delaminate along the neutral axis at the neck areas. In addition, torsional load applied to the springs on turning of the vehicle, or torsional stress resulting from independent wheel suspension, also has a tendency to delaminate the strands at the neutral axis adjacent the neck area.

To prevent this delamination it has been proposed to add clamps or other fasteners at the vulnerable neck area, but the addition of these fasteners normally requires holes or other openings to be formed in the spring which severs the longitudinally extending reinforcing strands and correspondingly reduces the physical characteristics of the spring.

SUMMARY OF THE INVENTION

The invention is directed to an improved bushing construction for a fiber reinforced plastic leaf spring. The spring is formed by winding a strand of fibrous material impregnated with an uncured thermosetting resin around a pair of bushings in a loop configuration to provide a pair of generally parallel runs that extend between the bushings and curved end portions that extend around the bushings and connect the runs together.

In accordance with the invention, the bushings are formed with at least one circumferential rib which extends outwardly from the central tubular section of the bushing and the fibrous windings are located within the grooves between adjacent ribs. After the winding operation is completed, the wound structure is placed in a mold with the parallel runs brought into flatwise relationship and the wound structure is subjected to heat and pressure to cure the resin and provide a rigid, integral structure.

While circumferentially extending ribs would normally be expected to increase the resistance to axial displacement or push-out of the bushings, the ribs in the present invention also serve to prevent delamination of the strands along the neutral axis at the neck areas where the central section joins the end sections of the spring. The elimination of delamination through use of the ribs is completely unexpected. It is believed that the ribs increase the surface area between the bushings and the windings, and as this surface is under shear stress, delamination of the windings at the neck area is reduced.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of a leaf spring made in accordance with the invention;

FIG. 2 is a perspective view of the bushing; and

FIG. 3 is a side elevation of an end of the spring.

DESCRIPTION OF THE PREFERRED EMBODIMENT

FIG. 1 illustrates a fiber reinforced plastic leaf spring 1 for use with a vehicle which consists of a central curved section 2 and a pair of end sections 3 and 4 which are integrally connected to central section 2. End sections 3 and 4 are provided with tubular bushings 5 and 6 which receive connectors to connect the spring to a vehicle in a conventional manner. The bushings 5 and 6 can have any desired configuration depending upon the spring construction of the vehicle.

Spring 1 is formed of strands of substantially continuous fibrous material which are wound in looped configuration around the bushings 5 and 6 in a number of superimposed layers to provide the desired physical characteristics for the spring.

The strands can take the form of any type of fibrous material normally used in filament winding operations as for example, synthetic fibers, such as nylon, Dacron or Orlon; mineral fibers, such as glass; vegetable fibers such as cotton; animal fibers, such as wool; or metal fibers, such as steel wire; or carbon or graphite fibers.

The strands are impregnated with an uncured liquid thermosetting resin as conventionally used in filament winding operations. In most cases the resin will take the form of a polyester or epoxy resin.

After the winding operation has been completed, the wound structure is molded to form the spring as shown in FIG. 1. In the molding operation, the two parallel runs of the wound loop structure, indicated by 7 and 8, are brought together in the mold, and during the molding operation, the resin is cured to provide a rigid integral structure. In the molded structure the reinforcing strands extend continuously from the central section 2 around the end portions 3 and 4, with the junction between the central section and the end sections constituting neck portions as indicated by 9.

When the spring 1 is subjected to load in use, the critical stress area is along the neutral axis of the central section at the neck area, as indicated by the line 10.

In accordance with the invention, the stress concentration along the neutral axis 10 is reduced by a novel bushing construction. As best shown in FIG. 2, the bushing includes a tubular section 11 having a central opening 12, and a series of ribs 13 extend outwardly from tubular section 11. Each rib includes a pair of generally tapered side walls, which are located at an angle of about 10° to 20° with respect to a plane normal to the axis of the bushing. Side walls 14 terminate at a flat outer surface 15.

During the winding operation, the fibrous strands are wound in the grooves between adjacent ribs 13 and over the outer surfaces 15 of the ribs. On curing of the resin the fibrous strands are integrally bonded to the bushings. The height of ribs 13 indicated by A in FIG. 3, should be in the range of 1 to 8 times the radial dimension B of bushings 5 and 6, and preferably about 4 times the radial dimension B, in order to effectively prevent delamination at the neck area. While the drawings show the ribs 13 extending completely around the bushings, in some installations the ribs may extend, in either direction from the neutral axis 10, at least 90°.

It is preferred to form the bushings 5 and 6 of a molded plastic material, such as fiber reinforced thermosetting resin, although in some cases, the bushings can be formed of metal. Plastic bushings are corrosion resistant, are easier to fabricate by molding operations than metal bushings, and are more compatible with the fibrous windings. In addition, better adhesion is obtained between the fibrous strands and a molded plastic bushing than to a metal bushing. As a further advantage, plastic bushings provide better sound dampening between the wheel and the vehicle.

While the circumferential extending ribs 13 would normally be expected to aid in resisting axial pushout of the bushing from the spring, the ribs perform an entirely different function in the present invention. Axial displacement or pushout is of little significance in a leaf spring in that the forces developed during use of the spring are only nominal in an axial direction. However, the ribs, by increasing the surface area of contact between the windings and the bushing, substantially reduce the tendency for the spring to delaminate at the critical stress area, along neutral axis 10 at neck area 9. This result is totally unexpected.

Various modes of carrying out the invention are contemplated as being within the scope of the following claims particularly pointing out and distinctly claiming the subject matter which is regarded as the invention.

I claim:

1. A fiber reinforced plastic leaf spring construction comprising, a curved central section and a pair of end sections connected to the respective ends of the central section, a tubular bushing disposed in each end section, said spring comprising a plurality of longitudinally extending substantially continuous strands of fibrous material impregnated with a cured thermosetting resin, said strands disposed in an upper run and a lower run in said central section and said strands extending around said bushings, said upper and lower runs being bonded together flatwise at a neutral axis and the strands of the central section joining the strands of the end sections at a neck area, each bushing including a tubular section having an opening to receive a connecting member, and at least one circumferentially extending rib extending radially outward from said tubular section, said rib disposed at the respective neck area and extending through an arc on either side of said neutral axis, said rib having a pair of spaced side walls and an outer surface, and said strands being disposed in contact with said side walls and extending over said outer surface, said rib increasing the surface area of contact between the strands of fibrous material and the bushing and providing an area of shear stress between the bushing and said strands, thereby aiding in preventing delamination of said spring along said neutral axis when the ends of the spring are subjected to load in service.

2. The spring construction of claim 1, wherein said rib extends through an arc of at least 90° on either side of said neutral axis.

3. The spring construction of claim 1, wherein the rib has a radial dimension from 1 to 8 times the radial dimension of said tubular section.

4. The spring construction of claim 1, wherein said bushing is formed of molded plastic.

5. The spring construction of claim 1, and including a plurality of ribs spaced apart along the length of said bushing.

6. A fiber reinforced plastic leaf spring construction, comprising a curved central section and an end section connected to each end of the central section, a bushing disposed in each end section and including a tubular section and a plurality of ribs extending radially outward from said tubular section, said ribs being spaced along the length of said bushing, said spring comprising a plurality of longitudinally extending substantially continuous strands of fibrous material impregnated with a cured thermosetting resin, said strands disposed in an upper run and a lower run in said central section and said strands extending around said bushing and being disposed within the spaces between adjacent ribs and covering the outer periphery of said ribs, said upper and lower runs being bonded together flatwise at a neutral axis, the strands of the central section joining the strands of the end sections at neck areas, said ribs increasing the surface area of contact between the strands of fibrous material and the bushing and providing an area of shear stress between the bushing and said strands, thereby serving to prevent delamination of said spring along the neutral axis at said neck areas when the ends of the spring are subjected to load during service.

7. The spring construction of claim 6, wherein said ribs extend around the entire circumference of said tubular section.

8. The spring construction of claim 6, wherein said bushings are composed of fiber reinforced plastic material.

9. The spring construction of claim 6, in which the radial height of the ribs is from 1 to 8 times the radial thickness of said tubular section.

* * * * *